United States Patent
Doumet

(10) Patent No.: US 9,619,824 B2
(45) Date of Patent: Apr. 11, 2017

(54) DISPLAYING ADS ON A MOBILE DEVICE OUTSIDE OF A MOBILE APP

(71) Applicant: Francis George Doumet, Vancouver (CA)

(72) Inventor: Francis George Doumet, Vancouver (CA)

(73) Assignee: ADENDA MEDIA INC., Vancouver, BC (CA)

( * ) Notice: Subject to any disclaimer, the term of this patent is extended or adjusted under 35 U.S.C. 154(b) by 349 days.

(21) Appl. No.: 14/153,014

(22) Filed: Jan. 11, 2014

(65) Prior Publication Data

US 2015/0039440 A1 Feb. 5, 2015

Related U.S. Application Data

(60) Provisional application No. 61/860,688, filed on Jul. 31, 2013.

(51) Int. Cl.
*G06Q 30/02* (2012.01)

(52) U.S. Cl.
CPC ..... *G06Q 30/0267* (2013.01); *G06Q 30/0241* (2013.01); *G06Q 30/0269* (2013.01)

(58) Field of Classification Search
CPC . G06Q 30/02; G06Q 30/0241; G06Q 30/0267
USPC .......................................................... 705/14
See application file for complete search history.

(56) References Cited

U.S. PATENT DOCUMENTS

| | | | |
|---|---|---|---|
| 2005/0038699 A1* | 2/2005 | Lillibridge | G06Q 30/02 705/14.35 |
| 2006/0069616 A1* | 3/2006 | Bau | G06Q 30/02 705/14.53 |
| 2006/0253453 A1* | 11/2006 | Chmaytelli | G06F 17/30867 |
| 2007/0179792 A1* | 8/2007 | Kramer | G06Q 30/02 705/1.1 |
| 2008/0004952 A1* | 1/2008 | Koli | G06Q 30/02 705/14.55 |
| 2008/0168099 A1* | 7/2008 | Skaf | G06Q 30/02 |
| 2009/0070190 A1* | 3/2009 | Gorty | G06Q 30/02 705/14.6 |
| 2010/0114706 A1* | 5/2010 | Kosuru | G06Q 30/02 705/14.55 |
| 2012/0096431 A1 | 4/2012 | Madar | |
| 2012/0130801 A1 | 5/2012 | Baranov | |

(Continued)

FOREIGN PATENT DOCUMENTS

EP 2224323 9/2010

*Primary Examiner* — Vincent Cao
(74) *Attorney, Agent, or Firm* — Rupak Nag

(57) ABSTRACT

Ads delivered to mobile devices by virtue of a mobile app executing on the device are displayed on the device screen outside the confines or borders of the mobile app. This enables app developers to display ads through their apps to app users wherein the ads are displayed outside the confines of the actual app as displayed on the device. That is, the ad may be displayed as what may be characterized as a 'regular non-app generated' ad, such as on the device's home or lock screen (display areas not normally associated with an app). In this manner, clutter is decreased within mobile apps that would otherwise be caused by the ads. Consequently, advertisers are more likely to pay higher rates thereby generating more revenue for app developers or related entities.

5 Claims, 4 Drawing Sheets

(56) References Cited

U.S. PATENT DOCUMENTS

2012/0232985 A1\* 9/2012 Lasker .................. G06Q 30/02
                                                            705/14.41
2012/0253939 A1   10/2012 Grigoriev \* cited by examiner

DISPLAYING ADS ON A MOBILE DEVICE OUTSIDE OF A MOBILE APP

CROSS-REFERENCE TO RELATED APPLICATIONS

This application claims priority under U.S.C. §119(e) to U.S. Provisional Application No. 61/860,688 filed Jul. 31, 2013, entitled "SYSTEM AND METHOD FOR DISPLAYING ADVERTISEMENTS ON A MOBILE DEVICE FROM OUTSIDE OF THE CONFINES OF A MOBILE SOFTWARE APPLICATION," incorporated by reference herein in its entirety.

BACKGROUND OF THE INVENTION

1. Field of the Invention

The present invention relates to software, advertising systems, and mobile devices. More specifically, it relates to software for displaying an online ad on a mobile device delivered via a software application and displayed outside the confines of the application as displayed on the mobile device screen.

2. Description of the Related Art

Presently, when software developers developing mobile software applications (hereafter "apps") that run on mobile devices want to display ads, they face one significant restriction: they can generally only display ads within the confines of the app itself as shown on the device. Because of the limited screen size of many mobile devices, this constraint increases clutter within the apps from the perspective of the user, causing user discontent and forcing ads to be displayed in small and confined areas of the app. This, in turn, decreases the quality and appeal of this form of mobile advertising in the eyes of advertisers, thereby driving down the value of such advertising and negatively impacting revenues earned by app developers. Furthermore, revenues earned by app developers are limited because ads are no longer seen by users once the apps are closed on the device.

To illustrate the problem of displaying mobile ads through an app on a mobile device, FIG. 1 is a block diagram of a mobile device screen. An app executes on a mobile device, for example a smart phone or tablet, having a screen 102. The app is displayed in primary screen area 104. Ads delivered to the device via the app are displayed in secondary screen area 106, often confined to a narrow area at the bottom of the screen or along one of the sides. As illustrated in FIG. 1, there is often not much display surface area to effectively deliver ads.

Other mobile ad delivery systems in use attempt to improve engagement with users, appeal to advertisers, and increase revenues to app developers by displaying longer, larger, and invasive ads, such as full-screen and video ads within the apps. These types of ads take up the entire display area of the app such that the user only sees (or mostly sees) only the ad at some point when using the app. For example, an ad may take up the entire primary screen area 104 in FIG. 1.

Present methods for addressing the issue of ineffective ads that clutter mobile apps focus on increasing user engagement with those ads which, in turn, appeals to advertisers, thereby increasing revenues to mobile app developers. One way this is presently done is by displaying more invasive ads, such as ads that occupy the entire screen or distracting video ads within mobile apps. These methods, however, only further increase clutter within mobile apps, tend to increase user frustration, and push users away from generally accepting ads in mobile apps by making the apps appear too ad-intensive or ad-centric.

In light of these drawbacks with regard to current mobile app ad delivery techniques, it would be desirable to be able to display ads in a manner that is non-intrusive, engaging, and visible and are seen as beneficial to all entities involved in the process.

SUMMARY OF THE INVENTION

In one aspect of the present invention, a method of displaying an ad on a screen of a mobile device is described. A first ad request is created by mobile app software. During this time, the mobile app software determines the location of the mobile device and collects mobile device user and mobile device information. A second ad request is then created based in part on the location and user and device information. The second ad request is transmitted from the mobile device to an ad server. If there is a response to this request from the ad server, that is, if there is an ad that fits the requirements of the second ad request, the ad is transmitted to the mobile device. The ad is then displayed on the screen of the mobile device. The ad is displayed on the screen within and/or outside the confines of the mobile app.

In another aspect of the present invention, a mobile device executing a mobile app capable of displaying ads outside the confines or borders of the mobile device is described. The mobile device includes a processor, a network interface, a display component, and a data storage component. The data storage component stores mobile app native software and a mobile ad software development kit (SDK). The SDK includes a mobile ad API, an ad manager, an ad display module, a mobile device user module, a mobile device location module, and mobile device module. The ad manager communicates with an ad server and with the mobile device user module, mobile device location module, and mobile device module.

BRIEF DESCRIPTION OF THE DRAWINGS

References are made to the accompanying drawings, which form a part of the description and in which are shown, by way of illustration, specific embodiments of the present invention.

DETAILED DESCRIPTION OF THE INVENTION

Example embodiments of an ad delivery system for apps executing on a mobile device are described. These examples and embodiments are provided solely to add context and aid in the understanding of the invention. Thus, it will be apparent to one skilled in the art that the present invention may be practiced without some or all of the specific details described herein. In other instances, well-known concepts have not been described in detail in order to avoid unnecessarily obscuring the present invention. Other applications and examples are possible, such that the following examples, illustrations, and contexts should not be taken as definitive or limiting either in scope or setting. Although these embodiments are described in sufficient detail to enable one skilled in the art to practice the invention, these examples, illustrations, and contexts are not limiting, and other embodiments may be used and changes may be made without departing from the spirit and scope of the invention.

Methods and system for displaying ads on a mobile device through execution of an app, wherein the ads may be displayed outside the confines of the app as displayed on the device screen are described in the various figures.

The present invention enables app developers to display ads through their apps to app users wherein such ads are displayed outside the confines of the actual app as displayed on the device. That is, the ad may be displayed as what may be characterized as a 'regular non-app generated' ad, such as on the device's home or lock screen (that is, display areas not normally associated with an app). These methods decrease clutter within mobile apps that are caused by the ads. Consequently, advertisers are more likely to pay higher rates thereby generating more revenue for app developers or related entities.

As noted, presently software developers designing mobile apps running on mobile devices can generally only display ads within the confines of the app itself. However, because of the limited screen size of many mobile devices, this constraint increases clutter within apps making it difficult for users to enjoy the app and forcing ads to be displayed in small and confined areas within the app. This, in turn, decreases the quality and appeal of this form of mobile advertising from the perspective of the advertisers, thereby driving down the economic value of such ads and negatively impacting revenues earned by software developers. Furthermore, revenues earned by software developers are limited because ads are no longer seen by users once a mobile app is shut down.

This invention, on the other hand, empowers mobile app developers to display ads to their users wherein the ads are displayed from outside of the confines of their mobile apps. This method decreases clutter within mobile apps due to ads, while still providing an outlet for apps to display ads to their users and earn revenue from advertisers or ad publishers.

Figure 1:
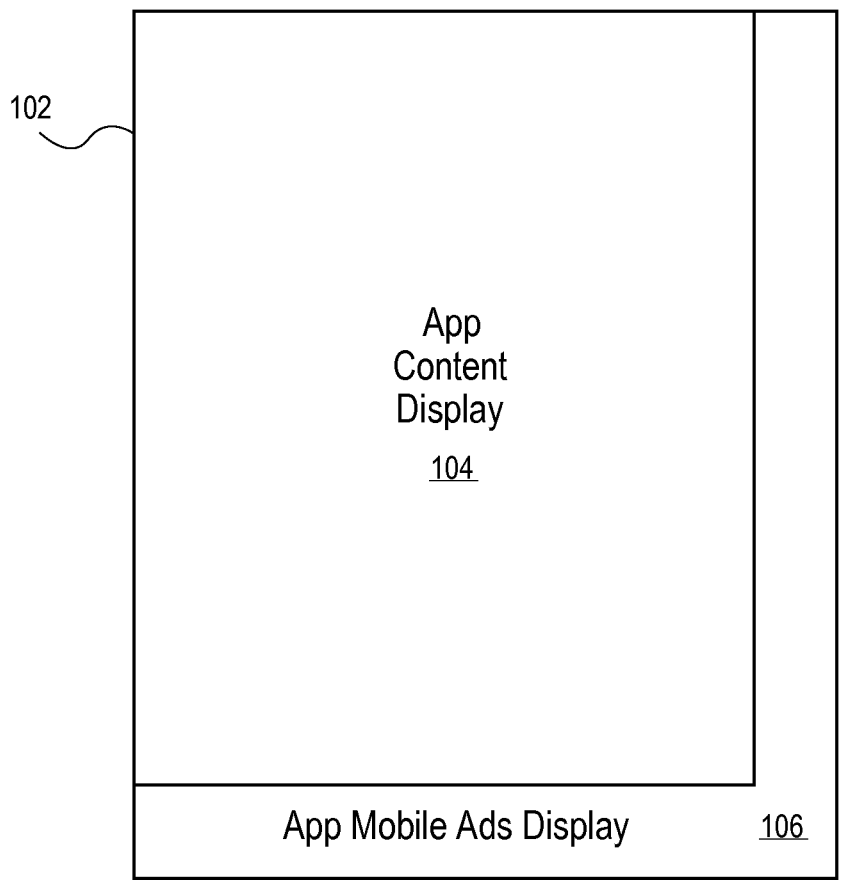
FIG. 1 is a block diagram showing a mobile device screen displaying an app and ads delivered through the app using conventional methods.
Figure 2:
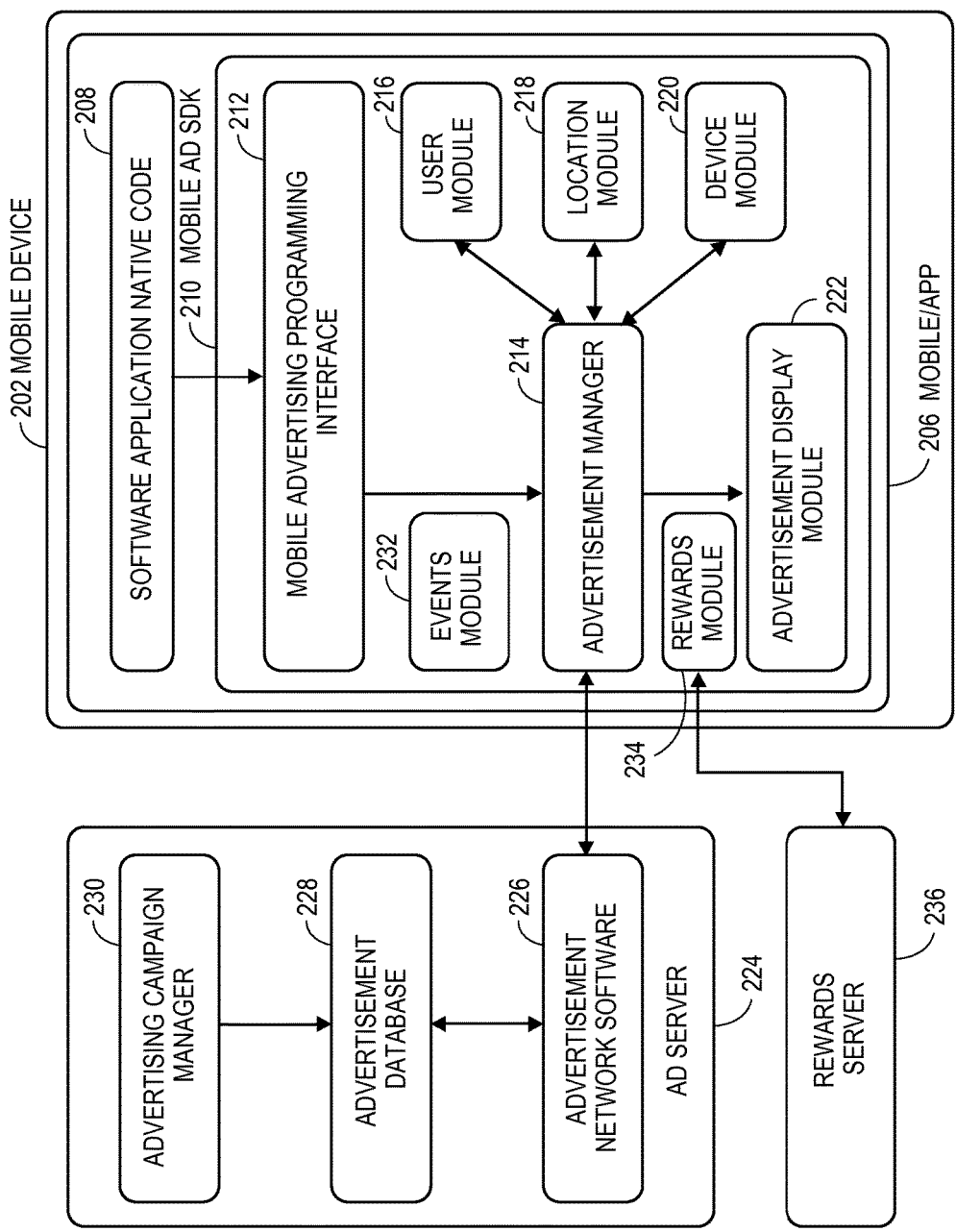
FIG. 2 is a block diagram showing numerous modules and components in the mobile ad delivery system of the present invention.

FIG. 2 is a block diagram showing numerous modules and components in the mobile ad delivery system of the present invention. At a high level, the system consists of two primary components: a mobile device 202, an ad server 224, and a rewards server 236. Embodiments of the present invention execute primarily on mobile device 202.

Figure 4A:
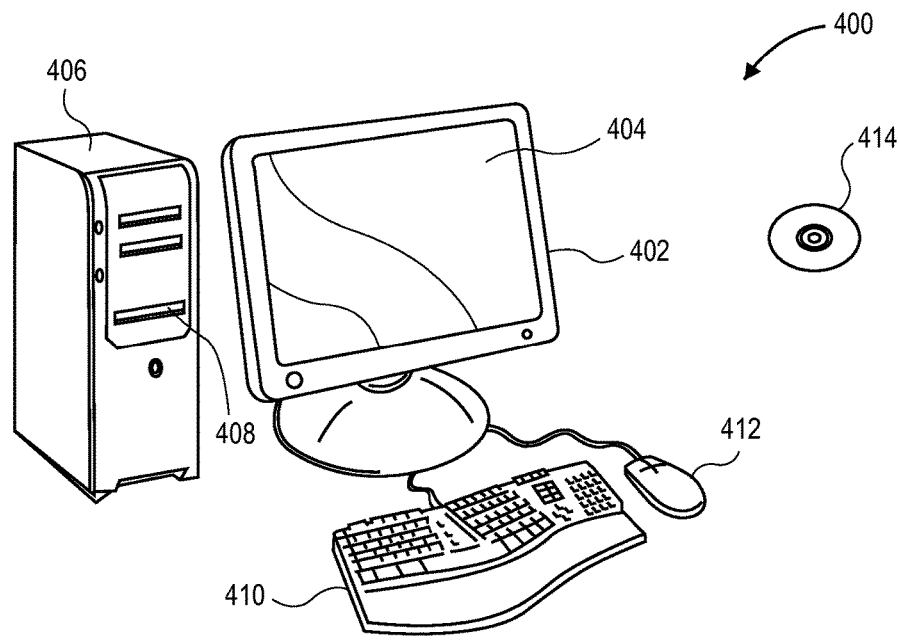
FIGS. 4A and 4B are block diagrams of a computing system, such as a mobile device or a server, suitable for implementing various embodiments of the present invention.
Figure 4B:
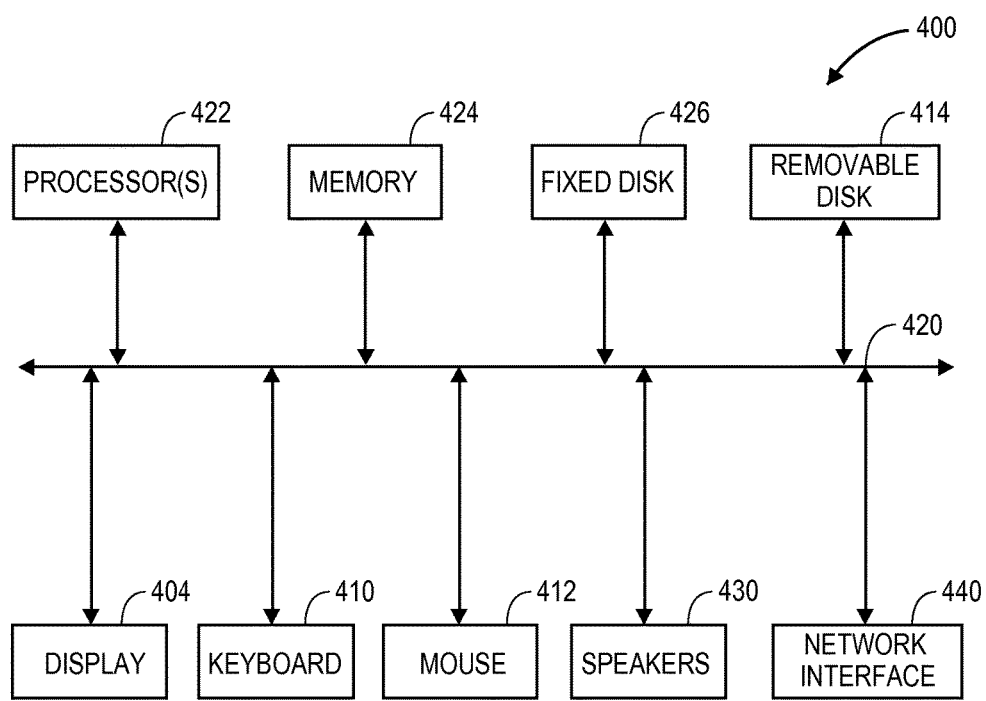

Mobile device 202, such as a mobile phone, tablet, or e-book reader, executes an app 206 using conventional components, such as those described in FIGS. 4A and 4B. App 206 is comprised of app source code 208 and is installed on mobile device 202. Software 208 incorporates or includes a mobile ad software development kit (SDK) 210.

Software development kit 210 includes several modules. One is a mobile ad programming interface (essentially an API) 212 which is in communication with an ad manager 214. Ad manager 214 transmits and receives data from three modules: a user module 216, a location module 218, and a device module 220. Ad Manager 214 also transmits data to an ad display module 222. SDK 210 communicates with app 206 (specifically, with source code 208) through API 212. SDK 210 communicates with an ad server 224 through ad manager 214. Ad server 224 runs ad network software 226 which sends and receives messages to and from ad manager 214. Ad server 224 also includes an ad database 228 and an ad campaign manager 230.

Mobile ad SDK 210 enables mobile app 206 to display ads on mobile device 202. The ads are displayed outside of app 206. As noted, SDK 210 contains mobile ad API 212 which presents a library of functions used by app source code 208. These functions are used to control the display of ads on mobile device 202.

Once app source code 208 signals mobile ad SDK 210 through API 212 to begin displaying ads, ad manager 214 collects information on the app/device user, such as gender and age, through user module 216, the geographical location of mobile device 202 through location module 218, and physical information relating to device 202, such as make and type, through device module 220.

This user, location and device information is packaged by ad manager 214 as an ad request and is sent to ad server 224. The ad request is picked up by ad network software 226 on ad server 224, where it is analyzed to determine the best possible ad that matches the user, location, and device information passed by ad manager 214.

If a suitable match is found, details on the ad are fetched from ad database 228 and returned to ad manager 214 which constructs the ad based on the details received. Ad manager 214 passes the result to ad display module 222 which, ultimately, displays the ad on mobile device 202 outside the confines of app 206. Ad database 228 is populated with entries by ad campaign manager 230 which allows advertisers to define ad campaigns through various parameters, such as duration, budget, demographics, and geography.

Mobile app 206 can disable ad on device 202 from outside of app 206 through mobile API 212 at any time. When this happens, ad manager 214 stops collecting information from user module 216, location module 218, and device module 220, and stops communicating with ad server 224. Consequently, ad display module 222 stops displaying ads on mobile device 202.

When integrating with mobile ad SDK 210, app 206 has the option of enabling ads on device 202 outside of app 206 by default or allowing the user to decide. In the latter case, only if the user opts into receiving ads outside of mobile app 206 are ad requests made to ad server 224. When ad requests are received by network software 226, it analyzes data sent with the ad request in order to determine the best ad to display given the parameters of the request. The resulting ad, if any, is then displayed on mobile device 202.

An app developer uses or integrates SDK 210 into a mobile app he or she is developing. Furthermore, corresponding ad server 224 infrastructure is created in order to efficiently and accurately respond to ad requests made by mobile ad SDK 210.

In other embodiments, user module 216, location module 218, and device module 220 are not needed. They may only be needed to enable ad campaigns to be targeted to certain user demographics, locations, and mobile device types.

An events module 232 can be added to mobile ad SDK 210 so that ad on device 202 can be refreshed at the occurrence of specific operating system events. For example, module 232 would allow ads appearing on the mobile device's home and lock screens to be refreshed every time device 202 is put to sleep and re-awakened.

A rewards module 234 can also be added to SDK 210 in order to reward users for accepting ads on their mobile devices. If app 206 does not enable mobile ads outside of app 206 by default, users could still decide to opt into receiving such ads in return for rewards from mobile app 206. For example, if mobile software app 206 is a game, users could be rewarded with the game's virtual currency, if available, for every extra day that they continue to receive ads on their mobile device outside of the game itself as displayed on the device.

Mobile app developers use ad SDK 210 of the present invention to integrate with app 206 by adding a few lines of code in their existing app source code 208. Once this is complete, app 206 can begin to display ads on the user's mobile device 202 from outside of the confines of app 206.

If reward module 234 is implemented in the system, mobile software developers wishing to reward their users for displaying ads on their mobile device outside of mobile software app 206 will need the infrastructure of their own rewards server 236 in place to keep track of individual users' rewards. Next, mobile software developers register the address of their rewards server 236 with reward module 234. Lastly, app developers implement additional code on their server 236 to handle callbacks from reward module 234 to update user reward balances every time a user is awarded a new reward.

Figure 3:
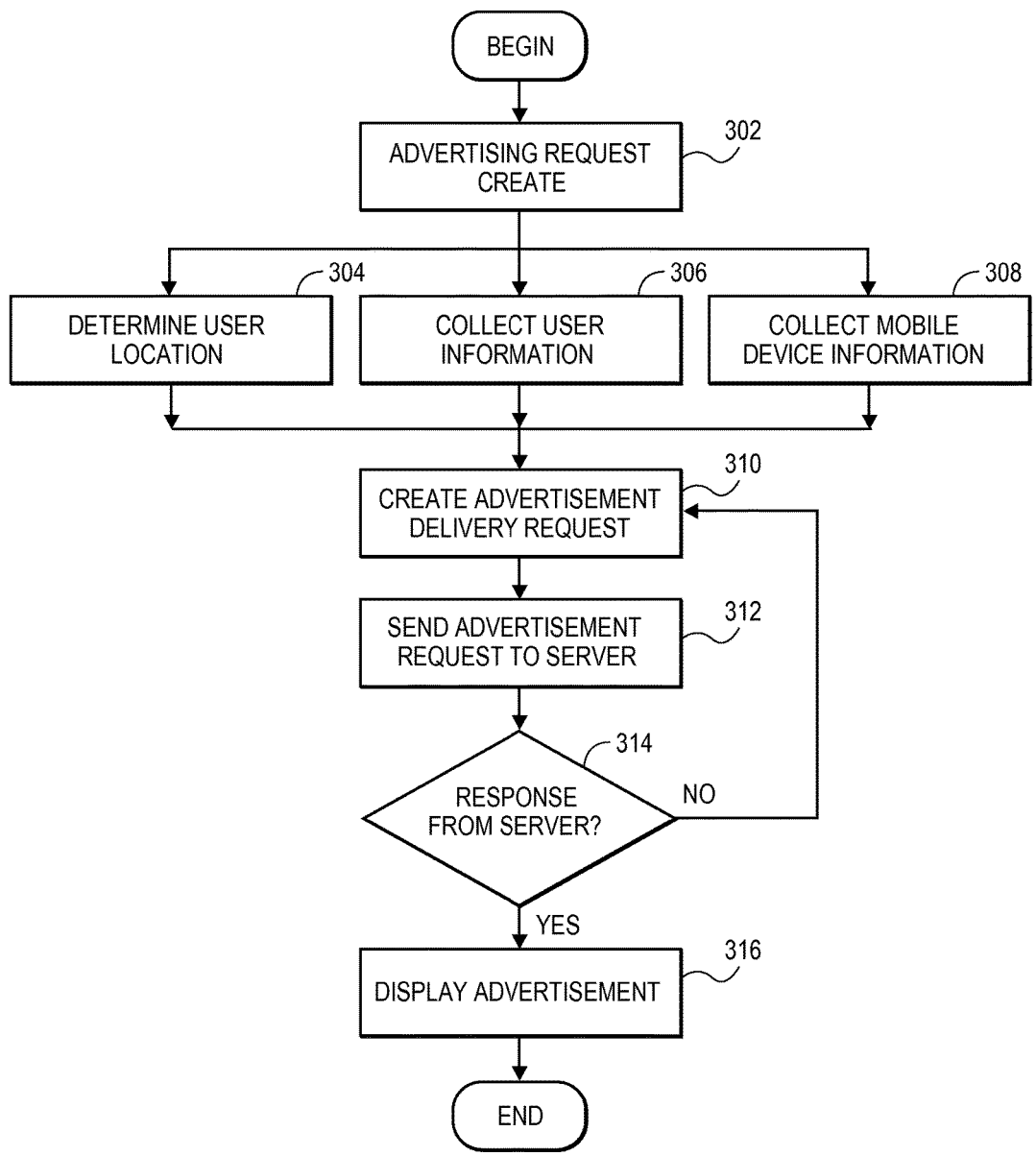
FIG. 3 is a flow diagram of a process of enabling the display of ads obtained via a mobile app outside of the app on the device display in accordance with one embodiment.

FIG. 3 is a flow diagram of a process of enabling the display of ads obtained via a mobile app outside of the app on the device display in accordance with one embodiment. At step 302 an ad request is created in mobile app 206. At step 304 module 218 determines the app user's location. At step 306 module 216 collects app user information. At step 308 module 220 collects mobile device information.

At step 310 ad manager 214 creates a request for an appropriate ad in light of user, location and device and to meet the requirements of the ad request created at step 302. At step 312 the request for an appropriate ad is transmitted to ad server 224 using ad manager 214. Server 224 then searches for a suitable ad in database 228 using ad campaign manager 230. If server 224 is able to find a suitable ad for display on the mobile device, control goes to step 316 where the ad is displayed outside the confines of app 206. If server 224 does not find a suitable ad, control goes back to step 310 where another ad request is created. This continues until an ad is displayed on the device at which time the process is complete.

FIGS. 4A and 4B illustrate a computing system 400 suitable for implementing embodiments of the present invention. FIG. 4A shows one possible physical form of the computing system. Of course, the computing system may have many physical forms including a small handheld device, such as a mobile phone or tablet. Computing system 400 includes a monitor 402, a display 404, a housing 406, a disk drive 408, a keyboard 410 and a mouse 412. Disk 414 is a computer-readable medium used to transfer data to and from computer system 400.

FIG. 4B is an example of a block diagram for computing system 400. Attached to system bus 420 are a wide variety of subsystems. Processor(s) 422 (also referred to as central processing units, or CPUs) are coupled to storage devices including memory 424. Memory 424 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 426 is also coupled bi-directionally to CPU 422; it provides additional data storage capacity and may also include any of the computer-readable media described below. Fixed disk 426 may be used to store programs, data and the like and is typically a secondary storage medium (such as a hard disk) that is slower than primary storage. It will be appreciated that the information retained within fixed disk 426, may, in appropriate cases, be incorporated in standard fashion as virtual memory in memory 424. Removable disk 414 may take the form of any of the computer-readable media described below.

CPU 422 is also coupled to a variety of input/output devices such as display 404, keyboard 410, mouse 412 and speakers 430. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 422 optionally may be coupled to another computer or telecommunications network using network interface 440. With such a network interface, it is contemplated that the CPU might receive information from the network, or might output information to the network in the course of performing the above-described method steps. Furthermore, method embodiments of the present invention may execute solely upon CPU 422 or may execute over a network such as the Internet in conjunction with a remote CPU that shares a portion of the processing.

Although illustrative embodiments and applications of this invention are shown and described herein, many variations and modifications are possible which remain within the concept, scope, and spirit of the invention, and these variations would become clear to those of ordinary skill in the art after perusal of this application. Accordingly, the embodiments described are to be considered as illustrative and not restrictive, and the invention is not to be limited to the details given herein, but may be modified within the scope and equivalents of the appended claims.

What is claimed is:

1. A method of causing an ad to be displayed on a screen at specific times by an application executing on a mobile device, the method comprising:

creating a first ad request, said creating performed by a mobile ad software development kit (SDK) incorporated in a mobile application and executed by a processor on the mobile device;

determining a location of the mobile device;

collecting mobile device user information;

collecting mobile device information;

creating a second ad request based in part on said location, said user information, and said device information, utilizing an ad manager module in the mobile ad SDK to transmit a second ad request to an ad server;

receiving an ad from the ad server, said receiving performed by the ad manager module, wherein said ad is transmitted to the mobile device by operation of the SDK; and utilizing an ad display module in the SDK to display the ad on the screen of the mobile device, wherein one of the times the ad is displayed by the application is one of when the application is not executing on the device or when the application is executing in the background on the device;

detecting an action performed by the user relating to the displayed ad when outside of the application; and providing rewards to the user wherein said rewards are related to the application and are given to the user while the application is executing, such that said detected action by the user outside of the application, wherein the application is one of closed, terminated, or not executing, directly relates to how the user is rewarded in the application, and such that a rewards module in said SDK is directly effected by said detected action by the user outside of the application;

wherein said displaying is directly caused by the SDK in the mobile app, thereby reducing clutter in an app display when the app is executing in the foreground.

2. A method as recited in claim 1 further comprising:
refreshing the ad on the mobile device at the occurrence of specific operating system events.

3. A method as recited in claim 1 further comprising:
assigning rewards to a user of the mobile app when a user agrees to accept ads on the mobile device.

4. A method as recited in claim 3 further comprising:
registering an address of a reward server with a rewards module in the SDK on the mobile device.

5. A method as recited in claim 4 further comprising:
utilizing the rewards server to maintain a record of user rewards.

* * * * *